(No Model.)
J. B. ARNTZEN.
VALVE.
No. 594,843.
Patented Dec. 7, 1897.
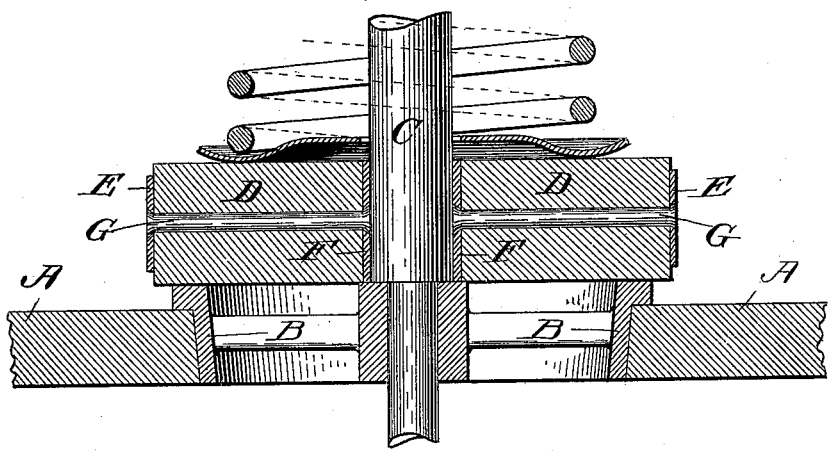
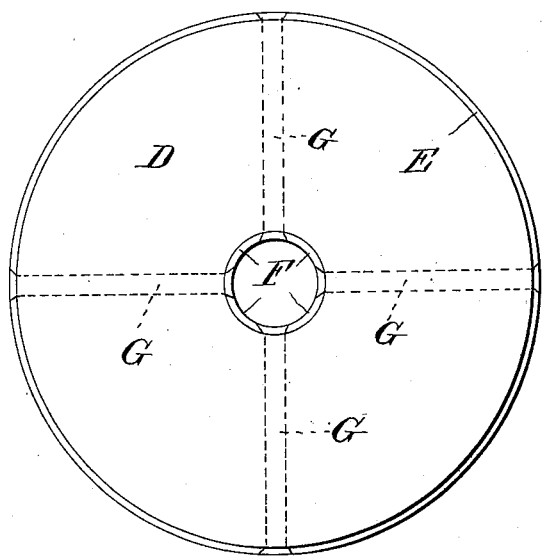
Witnesses:
G. A. Pennington
J. R. Cornwall
Inventor
John B. Arntzen,
by Paul Bakewell
his atty

UNITED STATES PATENT OFFICE.

JOHN BERNARD ARNTZEN, OF ST. LOUIS, MISSOURI, ASSIGNOR OF ONE-HALF TO JOHN G. WINTERS, OF SAME PLACE.

VALVE.

SPECIFICATION forming part of Letters Patent No. 594,843, dated December 7, 1897.

Application filed February 13, 1897. Serial No. 623,267. (No model.)

*To all whom it may concern:*

Be it known that I, JOHN BERNARD ARNTZEN, a citizen of the United States, residing in the city of St. Louis, State of Missouri, have invented a certain new and useful Improvement in Valves, of which the following is a full, clear, and exact description, reference being had to the accompanying drawings, forming a part of this specification, wherein—

Figure 1 is a sectional view through my improved valve, showing the same in operative position. Fig. 2 is a top plan view of the valve.

This invention relates to a new and useful improvement in valves, the object being to construct a valve which will be yielding and which will truly seat itself and one which will wear a long time.

With this object in view the invention consists in constructing a valve of ligneous material, banding the same with metallic straps to keep the same in shape and prevent splitting, and introducing binding through bolts or rivets, which not only hold the bands in position, but prevent the material of which the valve proper is composed from warping out of shape.

In the drawings, A indicates the casing or partition of the pump, in which is formed the opening controlled by my improved valve.

B is the valve-seat, of ordinary construction.

C is the stem, and D the valve. This valve is made of wood, the grain running either way, but preferably vertically. The valve is banded on its periphery by a metallic band E, made, preferably, of brass, so that it will not corrode. An opening is made in the center of the valve for the passage of the stem C, and this opening receives a wear-sleeve or thimble F, which not only acts as a wear-surface, but also prevents the material of the valve when swelling from crowding inwardly toward the stem, which it would bind. These bands E and F, or, more properly, band E and sleeve F, are held in position by through bolts or rivets G, which also act as braces for the valve to keep the same in shape by resisting any warping tendency which the valve might have when not in use for any length of time. I have shown four rivets G; but it is obvious that a greater number could be used, if desired.

From the above description it will readily be seen that the wood of which the valve is composed when wet by the liquid being pumped will become soft and make a perfect seat. By absorbing the liquid the ligneous material will soon become "water-logged," when it will keep its shape indefinitely without being influenced by swelling or warping, except when one side of the valve becomes dry and the other remains wet, which is not liable to happen, as neither side is exposed to the atmosphere direct. Again, when grit or foreign substances are on the seat the valve is liable to embed them and still make a perfect seat until the liquid washes such foreign material away. In this respect it is unlike hard rubber and brass, which would be cut under similar circumstances. When one side of the valve is worn, it may be reversed and its other side used with the same results as if a new valve were introduced. The wood is also less liable to be affected by certain waters or chemicals than brass or rubber, and the initial cost of manufacture of my valve is not only considerably less, but its life is longer.

I have shown my valve as used in connection with a pump; but it is obvious that there are other uses to which it could as advantageously be put.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. The combination with the wooden valve, of a metallic band E embracing the same, a thimble or wear-sleeve F in a central perforation in the wooden portion of the valve, and radially-disposed rivets G, passing through the wooden portion of the valve, the ends of said rivets being secured in the band E and sleeve F; substantially as described.

2. The combination with a valve-seat, and valve-stem, of a valve arranged to slide on said stem and coöperate with said seat, said valve comprising a wooden body portion, a band surrounding said body portion, a sleeve acting as a wear-surface for the stem, and rivets passing through the wooden body portion of the valve, the ends of said rivets being secured in the band and in the sleeve; substantially as described.

In testimony whereof I hereunto affix my signature, in presence of two witnesses, this 4th day of February, 1897.

JOHN BERNARD ARNTZEN.

Witnesses:
F. R. CORNWALL,
HUGH K. WAGNER.